United States Patent
Tamai et al.

(10) Patent No.: US 9,221,458 B1
(45) Date of Patent: Dec. 29, 2015

(54) ENGINE START CONTROL FROM A HIGH-POWER EV MODE

(71) Applicant: GM GLOBAL TECHNOLOGY OPERATIONS LLC, Detroit, MI (US)

(72) Inventors: Goro Tamai, West Bloomfield, MI (US); Lan Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/447,965

(22) Filed: Jul. 31, 2014

(51) Int. Cl.
*B60W 20/00* (2006.01)
*B60K 6/485* (2007.10)
*B60W 10/06* (2006.01)
*B60W 10/08* (2006.01)
*B60K 6/48* (2007.10)
*B60K 6/26* (2007.10)

(52) U.S. Cl.
CPC ............... *B60W 20/40* (2013.01); *B60K 6/48* (2013.01); *B60K 6/485* (2013.01); *B60W 10/06* (2013.01); *B60W 10/08* (2013.01); *B60W 20/10* (2013.01); *B60K 2006/268* (2013.01); *B60W 2510/06* (2013.01); *B60W 2710/06* (2013.01); *B60W 2710/08* (2013.01); *Y10S 903/902* (2013.01)

(58) Field of Classification Search
CPC ... B60W 20/40; B60K 6/48; B60K 2006/268; B60K 6/485
USPC .......................................................... 701/22
See application file for complete search history.

(56) References Cited

U.S. PATENT DOCUMENTS

| 5,979,158 | A * | 11/1999 | Kaiser et al. ..................... 60/274 |
| 7,597,648 | B2 * | 10/2009 | Conlon et al. ..................... 477/4 |
| 2002/0179348 | A1 * | 12/2002 | Tamai et al. .................. 180/65.2 |
| 2006/0076914 | A1 * | 4/2006 | Yaguchi ......................... 318/432 |
| 2011/0006723 | A1 * | 1/2011 | Yamakawa et al. ............ 318/812 |
| 2012/0024252 | A1 * | 2/2012 | Miller et al. ................ 123/179.3 |
| 2013/0296113 | A1 * | 11/2013 | Nefcy et al. ...................... 477/5 |
| 2013/0296126 | A1 * | 11/2013 | Gibson et al. ...................... 477/5 |
| 2013/0297105 | A1 * | 11/2013 | Yamazaki et al. .............. 701/22 |
| 2014/0277873 | A1 * | 9/2014 | Hartl et al. ...................... 701/22 |

(Continued)

FOREIGN PATENT DOCUMENTS

| JP | 10331749 A | * | 12/1998 | ............. F02N 11/08 |
| JP | 2000204997 A | * | 7/2000 | ............. F02D 29/02 |

(Continued)

*Primary Examiner* — Behrang Badii
*Assistant Examiner* — David Testardi
(74) *Attorney, Agent, or Firm* — Quinn Law Group, PLLC

(57) ABSTRACT

A vehicle includes an engine, power inverter module, transmission, engine brake, and control system. The transmission has a stationary member, gearbox, and electric traction motor controlled via pulse width modulation. The engine brake selectively connects the engine to the stationary member in an electric vehicle drive mode. The control system executes a method to detect a requested autostart of the engine during the electric vehicle drive mode, disconnects the engine from the stationary member via the engine brake in response to the detected requested autostart, determines a driver-requested output torque and a maximum output torque of the transmission, and executes one of an engine self-lifting control routine and a motor over-modulation routine when the driver-requested output torque exceeds the calculated maximum output torque by less than a calibrated threshold, both routines when the driver-requested output torque exceeds the calculated maximum output torque by more than the calibrated threshold.

18 Claims, 2 Drawing Sheets

(56) References Cited

U.S. PATENT DOCUMENTS

2014/0288736 A1\* 9/2014 Martin et al. .................. 701/22
2015/0105949 A1\* 4/2015 Wright et al. .................. 701/22
2015/0119189 A1\* 4/2015 Okubo et al. ..................... 477/3

FOREIGN PATENT DOCUMENTS

| JP | 2011235818 A | \* | 11/2011 |
| JP | 2013023024 A | \* | 2/2013 |

\* cited by examiner

ENGINE START CONTROL FROM A HIGH-POWER EV MODE

TECHNICAL FIELD

The present disclosure relates to engine start control from a high-power electric vehicle (EV) mode.

BACKGROUND

A hybrid electric vehicle powertrain typically includes an internal combustion engine and a transmission, with the transmission having one or more high-voltage electric traction motors. The engine and/or the electric traction motors may provide input torque depending on the commanded powertrain operating mode. In an electric vehicle (EV) drive mode in particular, the engine remains off. The electric fraction motor(s) in EV drive mode are powered via a power inverter module, a high-voltage battery, and associated power electronics. When the engine is running, each electric traction motor may be operated as a generator to quickly recharge the cells of the battery. The engine may be automatically cranked and restarted when engine torque is needed, e.g., to shift the transmission to an electrically variable transmission (EVT) drive mode.

SUMMARY

An example hybrid electric vehicle includes an internal combustion engine, a transmission having one or more electric fraction motors, and a control system. The control system, which may include a hybrid control module (HCM) and an engine control module (ECM) in a possible embodiment, is programmed to selectively restart the engine during a high-speed/high-power electric vehicle (EV) drive mode. Engine restart occurs according to one or both of a pair of control routines as set forth herein.

The enabled vehicle speed range in an EV drive mode is conventionally limited. That is, an engine autostart event, if it is conducted at higher vehicle speeds when a substantial portion of the available motor torque is required to power the drive axles of the vehicle, could result in a rapid dip in transmission output torque. Such a dip, if severe enough, may be perceived by the driver and occupants of the vehicle as a driveline disturbance. Therefore, hybrid powertrain control schemes tend to avoid running in an EV drive mode above a threshold transmission output speed. The present control approach is intended to help solve this particular control problem.

In general, the control system described herein uses an engine self-lifting control routine and/or a motor over-modulation routine to minimize the severity of driveline disturbances during high-power engine restart events. Both control routines are described in detail below. The selected routine depends on the magnitude by which a driver-requested output torque exceeds a calculated maximum output torque, with both routines being used when the difference in these two torque values is large relative to a calibrated threshold. One or the other routine is selected, but not both, when the difference in these two torque values is less than the calibrated threshold.

In an example embodiment, a vehicle includes an engine, an engine brake that is engaged when the vehicle is in an EV drive mode and released in any engine-on modes, a transmission, a power inverter module (PIM), and a control system. The transmission also includes one or more electric traction motors, each of which is connected to a gear box of the transmission and controlled via pulse width modulation (PWM) of the PIM by the control system. The control system is programmed to detect a requested autostart event of the engine via the electric traction motor(s) during a high-power EV drive mode, and also to determine a driver-requested output torque and a maximum output torque.

The control system in this vehicle embodiment executes an engine self-lifting control routine via control of the engine and the electric traction motor(s) when the driver-requested output torque exceeds the calculated maximum output torque by less than a calibrated threshold. The control system alternatively executes the engine self-lifting control routine and, via the PIM, a motor over-modulation routine when the driver-requested output torque exceeds the calculated maximum output torque by more than the calculated threshold. Once the engine has started, the control system discontinues the routine(s) and transitions to an engine-on mode, e.g., an electrically variable transmission (EVT) mode.

The above features and advantages and other features and advantages of the present invention are readily apparent from the following detailed description of the best modes for carrying out the invention when taken in connection with the accompanying drawings.

DETAILED DESCRIPTION

Figure 1:
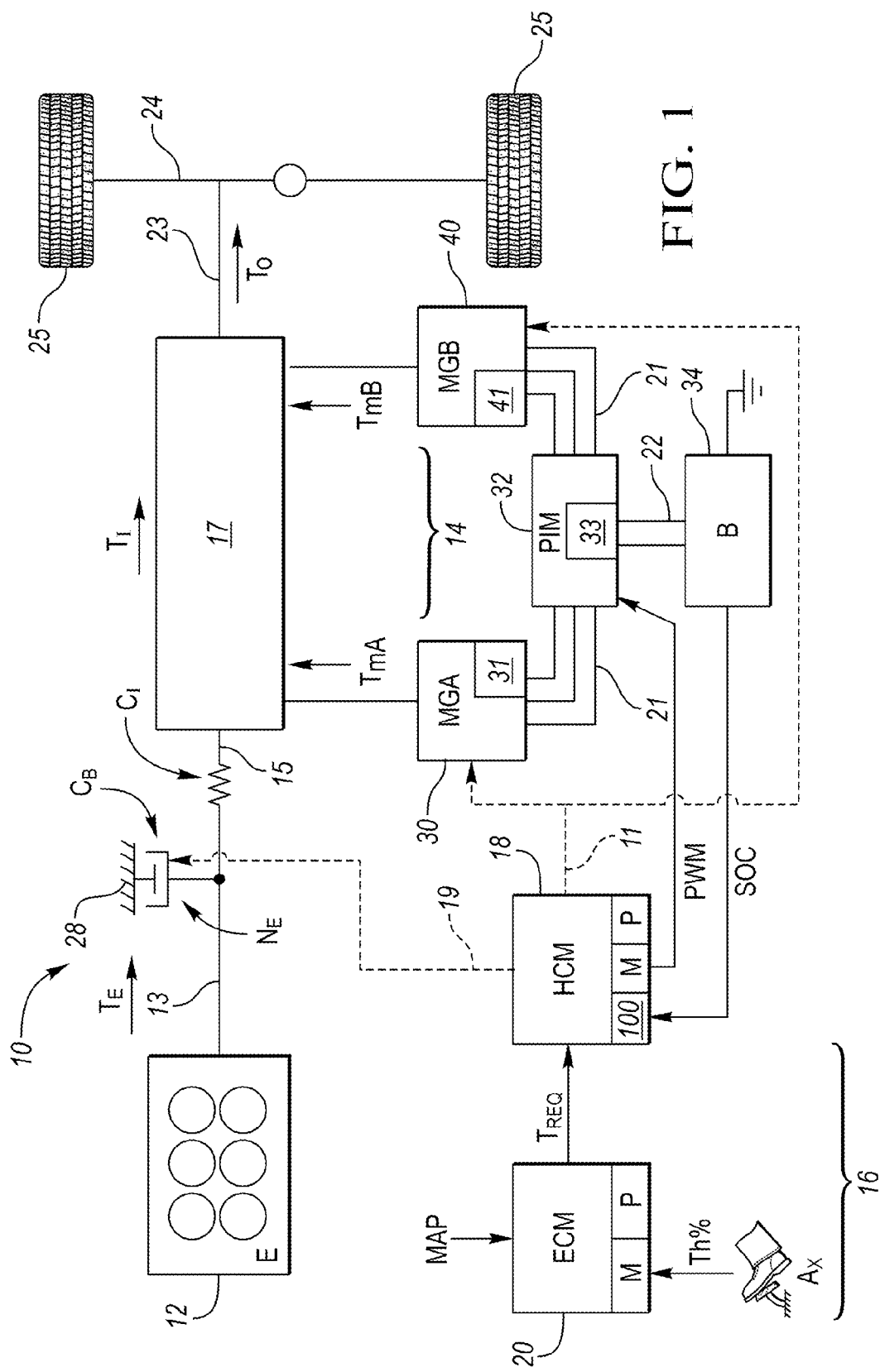
FIG. 1 is a schematic illustration of an example hybrid electric vehicle having an internal combustion engine, a transmission, and a control system programmed to control a start of the engine during a high-power electric vehicle (EV) drive mode.

Referring to the drawings, wherein like reference numbers correspond to like or similar components throughout the several figures, an example vehicle 10 is shown schematically in FIG. 1. The vehicle 10 includes an internal combustion engine (E) 12, a transmission 14 having a gearbox 17, and a control system 16. The control system 16 may be embodied as a distributed control system as shown having a top-level controller in the form of a hybrid control module (HCM) 18 and a separate engine control module (ECM) 20. The transmission 14 also includes one or more high-voltage, polyphase electric traction motors 30 and 40, which are also respectively labeled as MGA and MGB in FIG. 1. Each electric traction motor 30 and 40 delivers motor torque ($T_{mA}$, $T_{mB}$) to one or more gearsets (not shown) within the gearbox 17, and include a motor control processor 31 and 41, respectively, with the motor control processors 31 and 41 being part of the control system 16 described herein.

Figure 2:
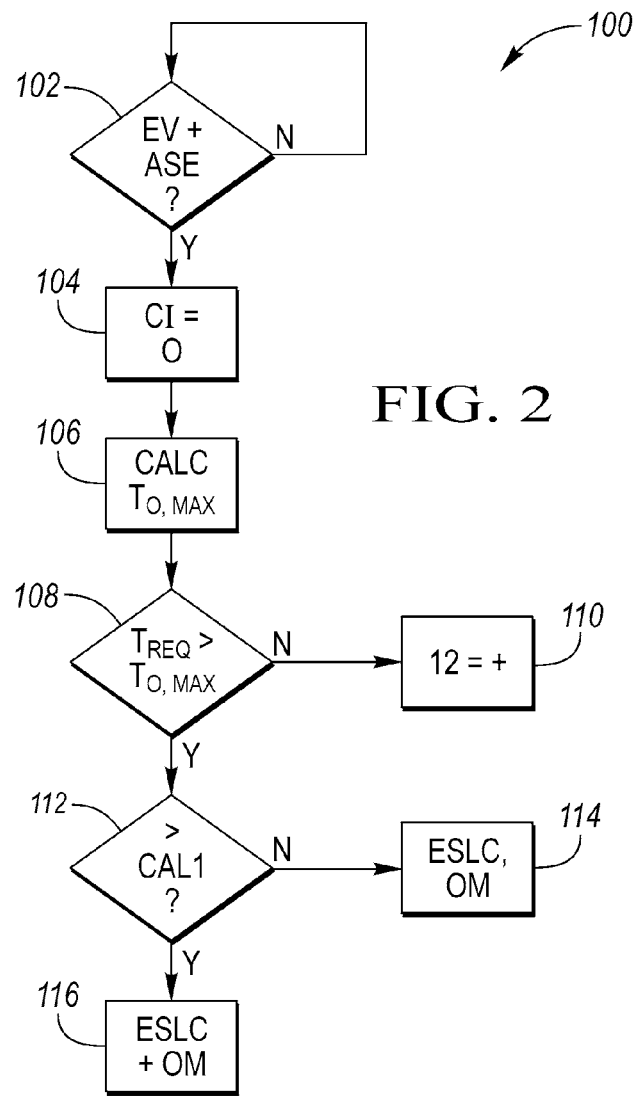
FIG. 2 is a flow chart describing an example embodiment for controlling a high-power engine start in the vehicle of FIG. 1.
Figure 3:
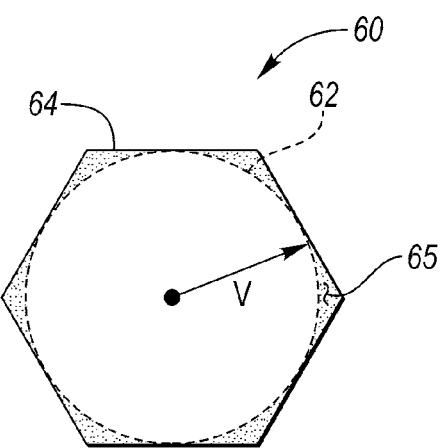
FIG. 3 is an example voltage vector diagram usable by the control system of FIG. 1.

As explained below with reference to FIGS. 2 and 3, the control system 16 is configured, i.e., programmed in software and equipped in hardware, to execute instructions embodying a method 100. The method 100 involves selectively executing one or both of two different control routines, i.e., an engine self-lifting control routine and a motor over-modulation routine, to minimize driveline disturbances during restart of the engine 12 at higher speeds of the vehicle 10, or during other high-power restart events. Use of the method 100 is intended to enable higher-speed/high-power electric vehicle (EV) drive modes relative to conventional control approaches which may avoid operating in such modes as a way of preventing an unacceptably severe driveline torque dip. An example embodiment of the method 100 is shown in FIG. 2 and described in more detail below.

The HCM 18 and the ECM 20 of FIG. 1 may each be configured as one or more computer devices having tangible, non-transitory memory (M). The HCM 18 may include elements as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include read only memory (ROM), e.g., magnetic and/or optical memory, as well as random access memory (RAM), electrically-erasable programmable read-only memory (EEPROM), and the like.

However configured, the HCM 18 executes the method 100 from its memory (M) during an EV drive mode, with communication between the HCM 18, the ECM 20, and the motor control processors 31 and 41 occurring via a controller area network bus or other suitable communications pathway as needed. The ECM 20 receives a throttle level (arrow Th %) from an accelerator pedal $A_X$ or other suitable throttle device, with the ECM 18 calculating driver-requested output torque (arrow $T_{REQ}$) from the throttle level (arrow Th %). The ECM 20 may also communicate the received driver-requested output torque (arrow $T_{REQ}$) to the HCM 18 as part of the method 100.

As used herein, the term "engine self-lifting control" refers to a coordinated control routine during which the engine 12 is cranked to relatively low rotational speeds before the ECM 20 commands a restarting of the engine 12, such as via fueling, spark, and/or airflow control. Engine speed ($N_E$) is smoothly raised to a calibrated threshold, e.g., 300-400 RPM. Off-the-shelf 12 VDC starter motor-based engine self-lifting systems exist for conventional engine start-stop systems. The present approach instead manages torque from the electric traction motors 30 and 40 in lieu of such a 12 VDC starter motor to crank the engine 12 to a threshold speed, for instance about 80-100 RPM, before requesting the starting of the engine 12 via the ECM 20.

Once started, the engine 12 may accelerate faster than is desired under the method 100. That is, engine speed ($N_E$) may tend to overshoot the threshold speed noted above. For example, if 300-400 RPM is the calibrated threshold speed, the engine 12 may quickly accelerate past 1000 RPM without intervention once the engine 12 has started. Therefore, as part of the method 100 the HCM 18 may control the output of the electric traction motors 30 and 40 via transmission of motor commands (arrows 11) to the motor control processors 31 and 41. This temporarily counters or suppresses the rising engine torque, thereby maintaining the rise in engine speed ($N_E$) at a calibrated ramp rate. Engine self-lifting is contrasted with conventional cranking and starting routines which accelerate an engine to 1000 RPM or more before commencing the aforementioned engine cranking and starting controls.

The term "motor over-modulation control" as used herein refers to a pulse width modulation (PWM)-based electric motor control routine that temporarily maximizes motor output torque. Such a routine is also commonly referred to as a "6-step mode" in the art. Referring briefly to FIG. 3, a voltage vector diagram 60 is shown for one phase of a three-phase voltage command to one of the electric traction motors 30 or 40 of FIG. 1. The voltage vector V rotates through a linear PWM region as delineated via a circle 62.

As part of the method 100, the HCM 18 selectively increases the output torque range of the electric traction motor 30 or 40 as needed via PWM control signals (arrow PWM) to a power inverter module (PIM) 32. This causes the electric traction motor 30 or 40 to enter the non-linear regions 65 of PWM, which are shaded in FIG. 3 for added clarity. Doing so may provide, temporarily, a 5-10% increase in available motor output torque up to a maximum limit, indicated by a boundary 64. Such an action comes at the cost of additional noise, vibration, and harshness (NVH) due to resultant torque ripple and other known effects of over-modulation. However, such NVH effects tend to diminish at higher vehicle speeds when over-modulation is selectively employed by the HCM 18, and are thus considered a reasonable performance tradeoff.

Referring again to FIG. 1, the engine 12 includes an output shaft 13 that is coupled to an input member 15 of the transmission 14, e.g., via an input damper ($C_I$). The output shaft 13 is selectively connected to a stationary member 28 of the transmission 14 via an engine brake ($C_B$), e.g., an electromechanical device or a hydraulic clutch which locks the engine 12 the stationary member 28 when the transmission 14 is in EV mode. The HCM 18 may selectively engage or disengage the engine brake ($C_B$) via clutch control signals (arrow 19) as needed. Engine torque (arrow $T_E$) passes as input torque (arrow $T_I$), alone or in conjunction with motor torque (arrows $T_{mA}$, $T_{mB}$) from the electric traction motors 30 and/or 40, into the gear box 17 of the transmission 14. Output torque (arrow $T_O$) is ultimately passed to an output member 23 of the transmission 14, and from there to a drive axle 24 and drive wheels 25 to propel the vehicle 10.

The electric traction motors 30 and 40 may be embodied as high-voltage, polyphase electric machines. For instance, the electric traction motors 30 and 40 may be rated for at least 200 VAC in one embodiment, such that the term "high-voltage" refers to any voltage levels in excess of conventional 12-15 VAC or VDC auxiliary voltage levels. In other embodiments, the voltage rating of the electric traction motors 30 and 40 may exceed 30-60 VAC. The electric traction motors 30 and 40 are electrically connected to the PIM 32 via a high-voltage AC bus 21, with the PIM 32 being a voltage-inverting device utilizing power conditioning electronics and semiconductor switches 33.

The semiconductor switches 33 may be embodied as IGBTs or MOSFETs which are rapidly switched in response to the PWM signals (arrow PWM) from the HCM 18. Such switching and any necessary signal filtering provides the required polyphase output voltage to the electric traction motors 30 and 40. The PIM 32 in turn is electrically connected to a high-voltage battery module (B) 34, e.g., a multi-cell rechargeable lithium ion battery or other suitable energy storage system, via a high-voltage DC bus 22. Battery parameters such as state of charge (arrow SOC) may be communicated to the HCM 18 and processed as part of the method 100 as explained below. The vehicle 10 may also include other power components not shown in the simplified diagram of FIG. 1, such as an auxiliary power module or voltage regulator which reduces voltage from the PIM 32 to 12-15 VDC auxiliary levels suitable for powering auxiliary vehicle systems.

Referring to FIG. 2, and with reference to the structural elements shown in FIG. 1, an example embodiment of the method 100 for controlling a high-power start of the engine 12 begins with step 102. At step 102, the HCM 18 detecting a requested autostart event of the engine 12 during an EV drive mode. Step 102 may include verifying that the present drive mode is an EV drive mode, which is known in logic of the HCM 18, and then determining the driver-requested output torque ($T_{REQ}$), e.g., via communication with the ECM 20. As noted above, the driver-requested output torque ($T_{REQ}$) may be determined by processing the throttle level (Th %) using the processor (P) of the ECM 20. Step 102 is repeated until the high-power engine auto-start event start is detected, at which point the method 100 proceeds to step 104.

Step 104 includes offloading the engine brake $C_B$ of FIG. 1 to disengage the engine 12 from stationary member 28. The HCM 18 may transmit the clutch control signals (arrow 19) to the engine brake $C_B$, with the nature of the clutch control signals (arrow 19) being dependent upon the particular design of the engine brake $C_B$. For example, a conventional hydraulically-actuated plate clutch might be controlled by a variable force solenoid (not shown), which is responsive to position or pressure commands, while an electro-mechanical clutch might be responsive to current or voltage signals. The method 100 proceeds to step 106 once the engine brake $C_B$ is disengaged or offloaded.

At step 106, the HCM 18 next calculates a maximum output torque ($T_{O, MAX}$). For instance, at 3000 RPM and 90° C., an example motor may produce torque of up to 200 Nm. The maximum output torque ($T_{O, MAX}$) for any given motor, as is well known in the art, may be computed as a function of various powertrain constraints. In the vehicle 10 of FIG. 1, such powertrain constraints may include the power limit of the battery module 34, can be determined via the state of charge (SOC), voltage, current, and/or other variables. Other constraints may include a calibrated desired acceleration of the input member 15, the engine torque of the engine 12, and the maximum motor torques. The engine torque may be calculated by the control system by referencing a lookup table of a speed and a manifold pressure (arrow MAP) of the engine 12, with speed known to the ECM 20 via the throttle (arrow Th %) or measured, to determine an engine friction torque during auto-start of the engine 12 when the engine 12 is off. Such a lookup table may be recorded in memory (M) of the HCM 18 or ECM 20.

With respect to maximum motor torques, such constraints may be likewise determined via a lookup table or by calculation. As is known in the art, each electric traction motor, including the electric traction motors 30 and 40 of FIG. 1, has a maximum torque curve that is indexed by input voltage and rotational speed, such that by measuring the motor voltage and speed, the HCM 18 may readily calculate or access the corresponding maximum motor torques. Though omitted for illustrative simplicity from FIG. 1, other electrical sensors such as voltage and speed sensors may be positioned within or with respect to the electric traction motors 30 and 40 to determine such values. The method 100 proceeds to step 108 once the maximum output torque ($T_{O, MAX}$) of the transmission 14 is known.

Step 108 entails determining if the driver-requested output torque ($T_{REQ}$) exceeds the calculated maximum output torque ($T_{O, MAX}$), such as via a simple mathematical logical comparison. Step 110 is executed when the maximum output torque ($T_{O, MAX}$) exceeds the driver-requested output torque ($T_{REQ}$), i.e., when the electric traction motor(s) 30 and 40 are able to provide the necessary torque without resorting to the special control steps 114 or 116. Step 112 is executed in the alternative when the driver-requested output torque ($T_{REQ}$) exceeds the calculated maximum output torque ($T_{O, MAX}$).

At step 110, the engine 12 of FIG. 1 is started using motor torque $T_{mA}$ and/or $T_{mB}$ from either or both of the electric traction motors 30 and/or 40 in a manner determined by the HCM 18. As step 110 is arrived at only after a determination at step 108 that the electric traction motors 30 and 40 have plenty of available motor torque to meet the requested output torque ($T_{REQ}$), the electric traction motor(s) 30 and 40 may crank the engine 12 all the way up to a desired starting engine speed, e.g., 600-700 RPM, before fueling/spark are commanded via the ECM 20 and starting of the engine 12 is commenced. The method 100 is finished when the engine 12 is running.

Step 112 may include accessing a calibrated axle torque dip threshold, which may be prerecorded in memory (M) of the HCM 18. Step 112 determines whether the driver-requested output torque ($T_{REQ}$) from step 102 exceeds the maximum output torque ($T_{O, MAX}$) by a calibrated amount (CAL 1), i.e., whether a threshold dip in axle torque would occur at restart of the engine 12. If so, the method 100 proceeds to step 116. The method 100 otherwise proceeds to step 114.

At step 114, the HCM 18 next selects and executes one of two different control routines, i.e., the engine self-lifting control (ESLC) routine and the motor over-modulation (OM) routine, both of which are described hereinabove. The selected routine may be determined offline for a range of vehicle speeds in a possible embodiment, for instance using objective or subjective cost criteria. Objective cost criteria may include power consumption, with step 114 including selecting the lower cost option. Subjective cost criteria may include engine start quality, for instance as perceived in a test vehicle at different speeds.

As higher-speed/higher-power starts of the engine 12 tend to become more transparent to the driver as speeds increase, particularly above a threshold speed of about 70 MPH, e.g., 60-80 MPH, step 114 may include executing one of the routines below the threshold speed and another above the threshold speed. However, regardless of the manner in which the routine is selected in step 114, only one routine is selected at this step. The method 100 is finished after step 114 repeating anew at step 102 at the next instance of a high-power engine start event.

Step 116 includes simultaneously executing both of the engine self-lifting control routine and the motor over-modulation routine. Step 116 is finished when step 116 is complete, as is the method 100. The method 100 repeats anew at step 102 upon the next instance of a high-power engine start event.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
an engine;
a power inverter module;
a transmission having a stationary member, a gearbox, and an electric traction motor connected to the gearbox and controlled via pulse width modulation of the power inverter module;
an engine brake that selectively connects the engine to the stationary member in an electric vehicle drive mode of the transmission; and
a control system in communication with the engine and the electric traction motor, wherein the control system is programmed to detect a requested autostart of the engine during the electric vehicle drive mode, to disconnect the engine from the stationary member, via the engine brake in response to the detected requested autostart, to determine a driver-requested output torque and a maximum output torque of the transmission, and to execute:
one of an engine self-lifting control routine via the engine and the electric traction motor, and a motor over-modulation routine via the power inverter mod- ule, when the driver-requested output torque exceeds the calculated maximum output torque by less than a calibrated threshold; and both the engine self-lifting control routine and the motor over-modulation routine when the driver-requested output torque exceeds the calculated maximum output torque by more than the calibrated threshold.

2. The vehicle of claim 1, wherein the control system is programmed to select a lower cost routine of the engine self-lifting control routine and the motor over-modulation routine when the driver-requested output torque exceeds the calculated maximum output torque by less than the calibrated threshold.

3. The vehicle of claim 2, wherein the control system is configured to determine an output speed of the transmission, and to select the lower cost routine based on the determined output speed.

4. The vehicle of claim 3, wherein the motor over-modulation routine is selected when the output speed of the transmission is above 70 MPH.

5. The vehicle of claim 1, wherein the control system is programmed to temporarily suppress a rise in speed of the engine via application of motor torque from the electric traction motor to the transmission during the engine self-lifting control routine, and to maintain a rise in the speed of the engine at a calibrated ramp rate.

6. The vehicle of claim 1, wherein the vehicle includes a battery, and the control system calculates the maximum output torque as a function of engine torque, a maximum torque of the electric traction motor, and a power limit of the battery.

7. The vehicle of claim 6, wherein the control system calculates the engine torque by referencing a lookup table of a speed and a manifold pressure of the engine to determine an engine friction torque during auto-start of the engine when the engine is off.

8. The vehicle of claim 1, wherein the electric traction motor includes first and second electric traction motors.

9. A method of starting an engine during a high-power electric vehicle drive mode of a vehicle having the engine and a transmission, the method comprising:

detecting a requested autostart event of the engine via a control system during the electric vehicle drive mode;

automatically disconnecting the engine from a stationary member of the transmission via actuation of an engine brake;

determining a driver-requested output torque and a maximum output torque of the transmission;

executing one of an engine self-lifting control routine or a motor over-modulation routine when the driver-requested output torque exceeds the calculated maximum output torque by less than a calibrated threshold; and executing both the engine self-lifting control routine and the motor over-modulation routine when the driver-requested output torque exceeds the calculated maximum output torque by more than the calibrated threshold.

10. The method of claim 9, wherein executing an engine self-lifting control routine or a motor over-modulation routine includes selecting a lower cost routine of the engine self-lifting control routine and the motor over-modulation routine.

11. The method of claim 10, further comprising determining an output speed of the transmission, and selecting the lower cost routine based on the determined output speed.

12. The method of claim 11, wherein selecting the lower cost routine based on the output speed includes selecting the motor over-modulation routine when the output speed is above 70 MPH.

13. The method of claim 9, further comprising temporarily suppressing a rise in a speed of the engine via application of motor torque from the electric traction motor to the transmission during the engine self-lifting control routine, and maintaining a rise in the speed of the engine at a calibrated ramp rate.

14. A system for a vehicle having an engine, an engine brake, and a power inverter module, the system comprising:

a transmission having a stationary member, an output member, and an electric traction motor that is controlled via pulse width modulation; and a control system in communication with the electric traction motor, wherein the control system is programmed to:

detect a requested autostart of the engine via a control system during an electric vehicle drive mode;

request disengagement of the engine brake in response to the detected requested autostart of the engine;

determine a driver-requested output torque and a maximum output torque of the transmission;

request one of an engine self-lifting control routine and a motor over-modulation routine when the driver-requested output torque exceeds the calculated maximum output torque by less than a calibrated threshold; and request both the engine self-lifting control routine and the motor over-modulation routine when the driver-requested output torque exceeds the calculated maximum output torque by more than the calibrated threshold.

15. The system of claim 14, wherein the control system is programmed to request a lower cost routine of the engine self-lifting control routine and the motor over-modulation routine when the driver-requested output torque exceeds the calculated maximum output torque by less than the calibrated threshold.

16. The system of claim 15, wherein the control system is configured to determine an output speed of the transmission, and to request the lower cost routine based on the determined output speed.

17. The system of claim 16, wherein the motor over-modulation routine is selected when the output speed is above 70 MPH.

18. The system of claim 14, wherein the control system is programmed to temporarily suppress a rise in speed of the engine via application of motor torque from the electric traction motor to the transmission during the engine self-lifting control routine, and to maintain a rise in the speed of the engine at a calibrated ramp rate.

\* \* \* \* \*